April 15, 1958     R. S. ZAPF     2,830,476
DEVICE FOR UNIFORMLY COUNTERSINKING HOLES
OF VARIOUS DIAMETERS IN ARTICLES
Filed Feb. 24, 1955     2 Sheets-Sheet 1
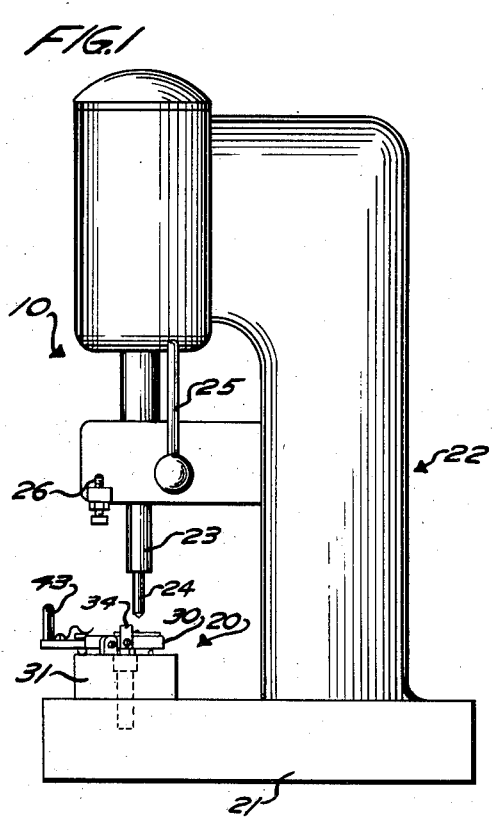
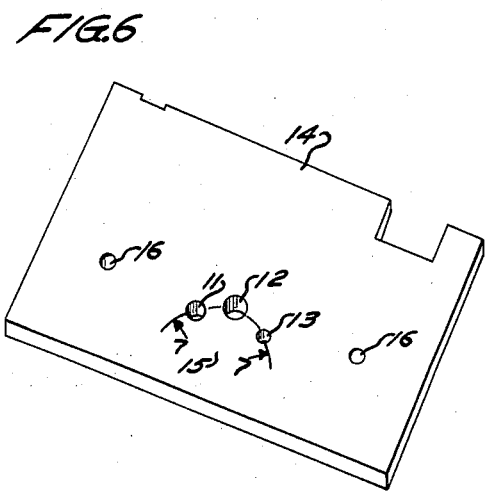
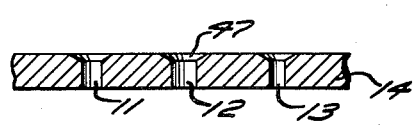
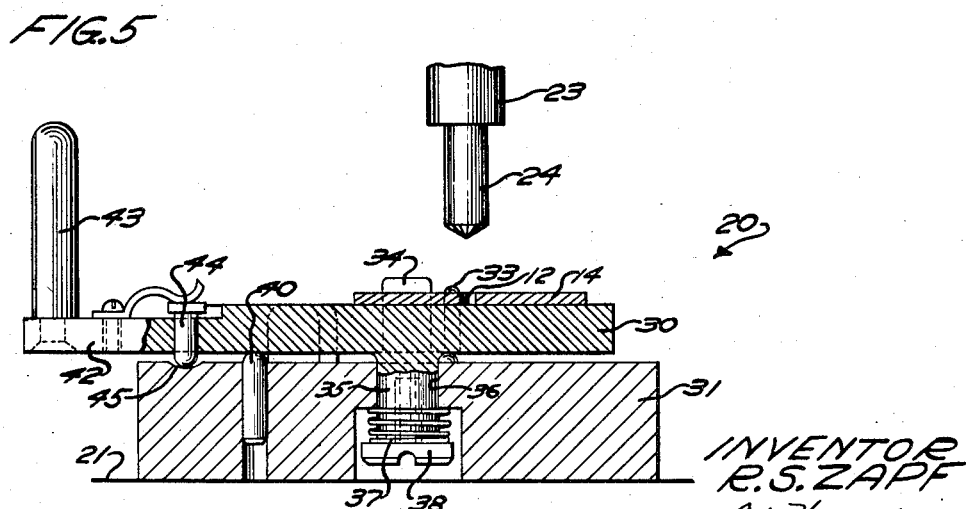
INVENTOR
R. S. ZAPF
BY C. B. Hamilton
ATTORNEY April 15, 1958  R. S. ZAPF  2,830,476
DEVICE FOR UNIFORMLY COUNTERSINKING HOLES
OF VARIOUS DIAMETERS IN ARTICLES
Filed Feb. 24, 1955  2 Sheets-Sheet 2
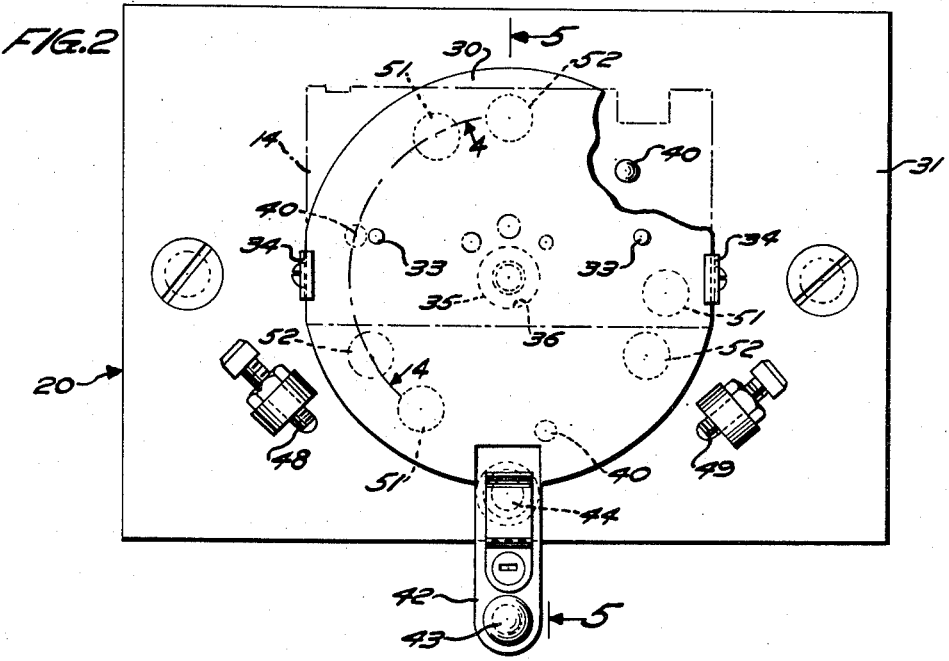
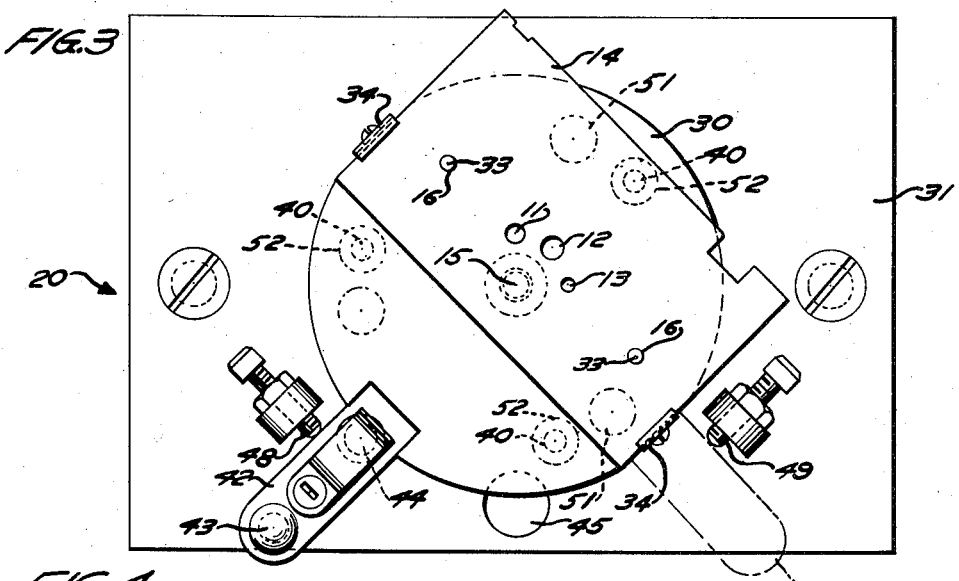
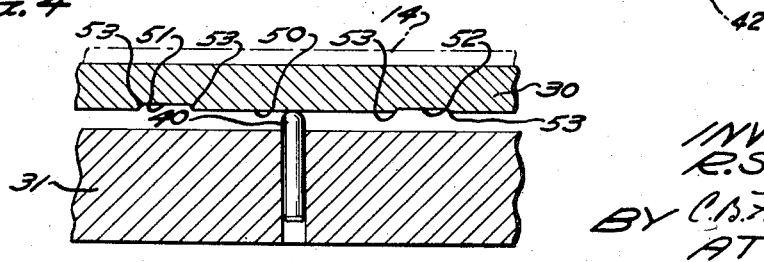
INVENTOR
R.S. ZAPF
BY C.B. Hamilton
ATTORNEY

United States Patent Office 2,830,476
Patented Apr. 15, 1958

2,830,476

DEVICE FOR UNIFORMLY COUNTERSINKING HOLES OF VARIOUS DIAMETERS IN ARTICLES

Richard S. Zapf, La Grange, Ill., assignor to Western Electric Company, Incorporated, New York, N. Y., a corporation of New York Application February 24, 1955, Serial No. 490,181

5 Claims. (Cl. 77—64)

This invention relates to a device for uniformly countersinking holes of various diameters in articles and more particularly to a fixture for supporting parts having holes of various diameters and moving the parts to various positions and elevations to align successive holes of various diameters therein with the countersinking tool to obtain uniform countersinking of the holes.

In the manufacture of various articles from sheet metal parts having holes therein which are to be tapped for securing other parts thereto, it is desirable to countersink one end of the holes to a uniform depth to remove any burrs therefrom and facilitate the entrance of the tap and the entrance of a screw into the tapped hole. It is essential that the countersink in the holes should be of a uniform minimum depth to leave the maximum amount of material in which to form the threads.

An object of the invention is to provide a device for uniformly countersinking holes of various diameters in a part.

Another object of the invention is to provide a fixture for supporting a part having holes of various diameters and moving the part into predetermined positions and various elevations to successively align the holes therein with the countersinking tool to provide for the countersinking of the holes to the same depth.

A device illustrating certain features of the invention may include a fixture for supporting a part having a plurality of holes of different diameters to be countersunk in a countersinking machine which has a rotatable countersinking tool movable axially downwardly to a predetermined position. The fixture has a base and a movable holder mounted thereon for supporting the part and moving it horizontally to predetermined positions to align the holes successively with the countersinking tool, and means are provided on the holder and the base for moving the holder vertically in response to movement of the holder to different positions to support the holder and the part at predetermined different elevations whereby the holes of different diameters may be countersunk to a uniform depth.

Other objects and advantages of the invention will become apparent by reference to the following detailed description and the accompanying drawings illustrating a preferred embodiment thereof, in which Fig. 1 is a side elevational view of a countersinking machine with a part supporting and positioning fixture thereon;

Fig. 2 is a plan view of the part supporting and positioning fixture showing the part holder in one position and showing in dot and dash lines a part thereon;

Fig. 3 is a view similar to Fig. 2 showing the holder with the part therein in a different position;

Fig. 4 is a fragmentary vertical sectional view taken along line 4—4 of Fig. 2;

Fig. 5 is a vertical sectional view of the fixture taken along line 5—5 of Fig. 2;

Fig. 6 is a perspective view of a part having a plurality of holes of different diameters which are to be countersunk to the same depth; and Fig. 7 is an enlarged fragmentary sectional view taken along line 7—7 of Fig. 6 showing the holes in the part countersunk to the same depth.

The present device 10 is designed to countersink a plurality of holes 11, 12, and 13 of various diameters in a flat relatively thin sheet metal part 14 which forms a frame component of an apparatus and is adapted to have other components secured thereto by screws threadedly engaging the holes 11, 12, and 13 after they have been tapped. As shown herein the holes 11, 12, and 13 are spaced from each other and are spaced a predetermined uniform distance from a point 15. A pair of positioning or aligning perforations 16 are also formed in the part 14.

The device 10 embodying the invention comprises a part supporting and positioning fixture 20 secured to a base 21 of a countersinking machine 22 having a motor driven spindle 23 in which a countersinking tool 24 is secured. Means including a manually operated lever 25 are provided for raising and lowering the spindle and the countersinking tool carried thereby. In the present device an adjustable stop 26 is set to limit the movement of the lever 25 and arrests the downward movement of the countersinking tool 24 in the same predetermined position.

The fixture 20 comprises a holder 30 for the part 14 and a plate 31 secured to the base 21 for supporting the holder for movement to a plurality of predetermined positions to support the part successively with the holes 11, 12, and 13 in coaxial alignment with the countersinking tool 24. The holder 30 is in the form of a disc having a flat upper surface for receiving the part 14 thereon and having a pair of aligning pins 33—33 engageable in the apertures 16 of the part for positioning the part on the holder in a predetermined location with the center point 15 thereof concentric with the axis of the disc. A pair of spring clips 34 secured to the opposite sides of the holder serve to yieldably retain the part in position in the holder. An axially disposed cylindrical post 35 extends downwardly from the holder 30 and is rotatably mounted in a bore 36 in the plate 31 for guiding the holder for oscillatable movement about its axis and for guiding the piece part for oscillatable movement about the point 15 thereon. A spring 37 encircling the post 35 and disposed in the enlarged counterbored portion of the bore 36 between the shoulders thereof and the head of a screw 38 secured to the post, stresses the holder 30 for movement downwardly against the upper round ends of a plurality of supporting pins 40 secured to the plate 31 and extending upwardly therefrom.

The holder 30 has a laterally extending arm 42 provided with a handle 43 by means of which the holder may be rotated about its axis. A spring pressed detent 44 on the holder is engageable in a recess 45 in the base to yieldably maintain the holder in a normal position as shown in Fig. 2. With the holder in this position a part 14 supported thereon is positioned with the hole 12 in coaxial alignment with the countersinking tool 24 (Fig. 5) and the holder and the part are supported at an elevation so that in response to actuation of the countersinking tool to its lowermost position the tool serves to countersink the hole 12 to a predetermined depth as indicated at 47, the holder 30 may be rotated in a clockwise direction to a predetermined position with the arm 42 in engagement with a stop 48 to position the part 14 with the hole 11 coaxially aligned with the countersinking tool 24 and the holder 30 may be rotated in a counterclockwise direction to a predetermined position with the handle 42 in engagement with a stop 49 to position the part 14 with the hole 13 in coaxial alignment with the countersinking tool 24.

Inasmuch as the countersinking tool descends to the same predetermined level, and the holes 11, 12, and 13 are of different sizes, means are provided for vertically shifting the holder 30 and the part 14 thereon to various elevations to insure the countersinking of the holes 11, 12, and 13 to a uniform depth. For this purpose the underside of the holder 30 is provided with a plurality of horizontal surfaces 50, 51, and 52 which are disposed in vertically and angularly spaced relation to each other as shown in Figs. 2 and 4 and have sloping cam surfaces 53 therebetween. The surfaces 50–53 cooperate with the round ends of the supporting pins 40 to raise and lower the holder 30 and the part 14 and to support them in their different elevations in response to rotary movement of the holder and the part from one position to another.

Thus, when the part 14 is moved by the holder 30 to the position shown in Fig. 2 to align the hole 12 of largest diameter with the countersinking tool, the holder and the part are automatically raised by the pins 40 and the surfaces 50 to a predetermined highest level whereby the countersinking tool may be actuated to obtain a counter-sink of a predetermined depth. When the holder is moved to the position shown in full lines in Fig. 3 to align the hole 11 with the countersinking tool, the holder and the part are automatically lowered to an intermediate level by the pins 40 and the surfaces 52 on the holder, whereby in response to the actuation of the countersinking tool the hole 11 is countersunk to the same uniform depth as that of the hole 12. In like manner, when the part 14 is positioned by the holder to align the hole 13 with the countersinking tool, the holder and the part are automatically positioned by the pins 40 and the surfaces 51 on the holder to the lowermost predetermined level for obtaining the same uniform countersink in the hole 13 in response to actuation of the countersinking tool.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for supporting an apertured part in various positions in a countersinking apparatus to obtain uniform countersinks in a plurality of apertures of various diameters in said part, a base member, a second member for supporting a part, means for yieldably retaining said part on said second member, means for positioning said part on said second member in a predetermined position, means mounting said second member for movement on said base member through a predetermined path to move the part with the apertures therein in coaxial alignment with the countersinking tool, means for moving said second member, means for locating said second member in a plurality of predetermined positions to coaxially align the apertures in said part individually with the countersinking tool, a plurality of elements on one of said members engageable with the other member, resilient means for urging said members toward each other to maintain said other member in engagement with said elements, and a plurality of surfaces on said other member disposed in angularly spaced relation to each other and at various elevations for engaging said pins and supporting said other member at various elevations in response to movement of said second member to said various positions.

2. In a device for supporting an apertured part in various positions in a countersinking apparatus to obtain uniform countersinks in a plurality of apertures of various diameters in said part, a base, a holder for supporting an apertured part thereon, means for guiding said holder and the part thereon for movement on said base through a single predetermined arcuate path, means for moving said holder, means for automatically locking said holder and the part thereon in a plurality of predetermined positions to coaxially align the apertures in the part individually with a single countersinking tool, and a plurality of spaced cam surfaces on said holder in contact with a fixed portion of said base for moving the holder to different elevations predetermined by the diameters of the apertures in the work to be countersunk and in response to the movement of the holder from one horizontal position to another.

3. In a device for supporting an apertured part in various positions in a countersinking apparatus to obtain uniform countersinks in a plurality of apertures of various diameters in said part, a base, a holder for supporting an apertured part thereon, means for guiding said holder, said holder being resiliently and pivotally mounted on said base and having a plurality of cam surfaces engaging said base for lateral and vertical movement respectively on said base to place the apertures of the part in coaxial alignment with a single countersinking tool and at different predetermined levels corresponding to hte diameter of the apertures in the part, means for moving said holder, and means for locking said holder in the various positions.

4. In a device for supporting an apertured part in various positions in a countersinking apparatus to obtain uniform countersinks in a plurality of apertures of various diameters in said part, a base, a holder for supporting an apertured part thereon, means pivotally mounting said holder on said base for moving said part through a predetermined arcuate path with the apertures of the work alignable with the countersinking tool, resilient means to retain the holder in sliding contact with the base at all times, means for moving said holder, means for automatically locking said holder in various predetermined positions to align the apertures in the part individually with said countersinking tool, said holder and said base having a plurality of spaced cam surfaces thereon for moving said holder and the part thereon to elevations in response to horizontal movement of the holder from one position to another.

5. In a work holding apparatus for positioning a work piece in relation to a rotating countersinking tool, a base having an aperture formed therein parallel to but offset wtih respect to the axis of rotation of the countersinking tool, a work holder having a stud shaft extending therefrom into the aperture in the base, resilient means for urging the work holder into engagement with the base, a plurality of pins extending from the upper surface of the base, said work holder having cam surfaces formed on the underside thereof cooperable with the pins, and means for rotating the work holder to move different cam surfaces into engagement with said pins.

References Cited in the file of this patent
UNITED STATES PATENTS

| | | |
|---|---|---|
| 69,533 | Bishop | Oct. 2, 1867 |
| 1,099,425 | Carper | June 9, 1914 |
| 1,377,495 | Logan | May 10, 1921 |